United States Patent Office 3,681,307
Patented Aug. 1, 1972

3,681,307
NOVEL POLYMERIZATION PROCESS
Marco Wismer, Gibsonia, and Paul J. Prucnal, Monroeville, Pa., assignors to PPG Industries, Inc., Pittsburgh, Pa.
No Drawing. Continuation-in-part of application Ser. No. 413,326, Nov. 23, 1964. This application Sept. 9, 1968, Ser. No. 758,622
The portion of the term of the patent subsequent to Feb. 17, 1987, has been disclaimed
Int. Cl. C08f 15/40
U.S. Cl. 260—80.7     10 Claims

ABSTRACT OF THE DISCLOSURE

This invention related to the interpolymerization of olefinically-unsaturated hydrocarbons by means of Ziegler catalysts. More particularly, this invention relates to a method of preparing non-rubbery interpolymers of a monoolefin monomer having a single copolymerizable ethylenic group, said interpolymer having an essentially saturated carbon atom in the polymer molecule and containing sufficient ethylenically-unsaturated groups in the polymer molecule to permit substantial curing of films thereof by oxidative mechanism, employing a Ziegler catalyst in a batch process in which the catalyst is incrementally added.

CROSS REFERENCE TO RELATED APPLICATION

This application is a continuation-in-part of U.S. application Ser. No. 413,326, filed Nov. 23, 1964, now U.S. Pat. No. 3,496,129.

The economics of a batch polymerization system, that is, the consumption of raw materials, time and labor expended and the need for solvent handling, solvent removal and of polymer isolation all contribute measurably to the cost of the product. It is desirable to obtain the highest solids level for each batch that is economically feasible. If the catalyst concentration in the reactor is increased, the percent solids formed in the batch likewise increases, but the catalyst efficiency falls off greatly, that is, the number of grams of polymer produced per gram of catalyst. It has now been found that the percent solids in a batch process may be substantially increased, thus producing higher total solids and reduced solvent handling by incremental addition of portions of catalyst with the added advantage of high catalyst efficiency; for example, in comparison, if the same total amount of catalyst is added in one step, the catalyst efficiency is markedly reduced.

The interpolymers of the present invention, which are non-rubbery or non-elastomeric, differ from the rubbery polymers known heretofore in several important respects, including the following:

(1) The interpolymers herein contain a comparatively high degree of functional unsaturation. This permits their curing by an oxidative mechanism to a highly cross-linked structure, whereas the rubbery polymers cannot be cured to this extent and require the use of a vulcanizing agent to achieve any degree of cure at all. The preferred interpolymers produced in accordance with this invention contain at least about 2 weight percent unsaturation, as defined below, and may have up to about 25 percent or even more. The rubbery polymers used as elastomers contain at least about 2 weight percent unsaturation, and generally less. It is extremely difficult to accurately determine unsaturation of these polymers by the iodine value procedure; however, the iodine values calculated from the level of unsaturation of the interpolymers herein are higher than those of the common rubbery polymers.

(2) As indicated, the mechanism of curing of these interpolymers differs from that of the rubbery polymers, and the extent of crosslinking thereby achieved is much higher. Whereas the rubbery polymers have a very low crosslink density, even if vulcanized, films of the present interpolymers are, contrastingly, air-drying, and when air-dried are sufficiently cured to achieve the properties necessary in a desirable coating, i.e., hardness, mar resistance, abrasion resistance, and the like. The mechanism of cure is oxidizing, involving the reaction of oxygen with the unsaturated linkages; this is evidenced, for example, by continuous infrared spectrographic examination of a film, which shows a progressive increase in oxidation products, such as carbonyl, during curing.

(3) The interpolymers of this invention are of lower molecular weight than the rubbery polymers, as indicated by their lower intrinsic viscosity. (Intrinsic viscosity is described, for example, in the book by Allen entitled "Techniques of Polymer Characterization," Butterworth Publications, Ltd., London (1959); the values herein being measured in benzene at 25° C., using an Ubbelohde Dilution Viscometer.) The intrinsic viscosity of the known rubbery polymers is at least 1.0, and usually 1.5 or higher. This is generally considerably higher than the intrinsic viscosity of the present interpolymers, which preferably have an intrinsic viscosity no higher than about 0.6, and usually quite lower; interpolymers of somewhat higher intrinsic viscosity can be employed for coatings in accordance with this invention, so long as the degree of unsaturation mentioned above is present.

(4) The present interpolymers are much more soluble in organic solvents than are the aforesaid rubbery polymers and can be dissolved in appreciable concentrations while maintaining a usable solution viscosity. For example, the preferred interpolymers have a Gardner-Holdt viscosity of Z or lower at 20 percent solids concentration in Solvesso 100 (aromatic naphtha) or xylene. This permits their use as a film-forming component in organic solvent-based coating compositions and, therefore, they can be used to provide stable coating compositions having desirable application properties. Solutions of rubbery polymers containing only about 10 to 15 percent solids have a completely unworkable viscosity, whereas there can be obtained solutions of the present interpolymers in benzene, xylene, aromatic naphtha or other solvents containing as much as 70 percent or more resin solids and having a utilizable viscosity.

In addition to their advantage over the related rubbery polymers, the interpolymers of the invention are highly advantageous as compared, for example, to the polymers of butadiene which have been employed in coating compositions. For instance, polybutadiene and butadiene-styrene copolymers result in brittle films which are useful only in very thin coatings, or which must be highly plasticized or otherwise modified to achieve the desired properties; thicker films of these materials can be cured only with extreme difficulty. The present interpolymers, on the other hand, are inherently flexible even in relatively thick coatings, and articles coated with these interpolymers can be formed and fabricated without destroying the continuity of the film.

Such differences are attributable in large part to the differing basic structure of the present interpolymers. These interpolymers have an essentially saturated carbon chain as the polymer backbone containing a substantial proportion (i.e., 20 percent or more) of the total carbon atoms in the polymer molecule. This polymer backbone, while essentially or predominantly saturated, contains some ethylenic unsaturation, principally in terminal position. At least a major part of the unsaturated linkages remaining in the polymer molecules are in pendant groups attached to the main polymer chain and are derived from the ethylenic linkages in the polyunsaturated component of the interpolymer.

The extent of unsaturation is sufficient to permit curing by oxidative mechanism, which in general requires at least about 2 percent by weight of unsaturation in the polymer. "Percent by weight of unsaturation," as employed herein, refers to the weight of groups of the structure

compared to the total weight of interpolymer. For instance, 2 percent by weight of unsaturation means each 100 grams of interpolymer contain 2 grams of carbon present in groups of the structure

The extent of unsaturation in a large part determines the curing characteristics of coatings made from the interpolymer and the preferred materials have at least about 2.5 percent by weight of unsaturation. For good curing characteristics at ordinary room temperatures, it is desirable that the polymer contain at least about 3.5 percent by weight unsaturation.

As indicated above, it is difficult to accurately determine the extent of unsaturation in these products by ordinary analytical techniques. For example, iodine value determinations have been found to be unreliable, and accurate analysis by chemical means in general requires very tedious and time-consuming procedures. One method which is applicable and which is usually convenient is by means of infra-red spectroscopic examination. Using such a method, the infra-red curve of the interpolymer is obtained in which the unsaturation is exhibited by a characteristic peak, for example, at about 3.3 microns in carbon tetrachloride solutions of interpolymers containing dicyclopentadiene (other solvents may shift this peak somewhat). The quantitative extent of unsaturation is determined by comparing the characteristic peak obtained from the interpolymer with that of a known material of similar structure and previously determined unsaturation level. Other techniques using infra-red examination can also be employed.

Another method for determining the extent of unsaturation is by means of nuclear magnetic resonance spectroscopy. This is particularly applicable to interpolymers containing unsaturation derived from polyunsaturated compounds with residual unsaturation resulting from $$\begin{matrix} R & H \\ | & | \\ -C=C- \end{matrix}$$

linkages, where R is hydrogen or alkyl, as in the case of the preferred interpolymers produced from dicyclopentadiene and similar polyunsaturated hydrocarbons.

In this method, a sample of the interpolymer is examined by a recording nuclear magnetic resonance (NMR) spectrometer. A spectrum is obtained with a series of absorption peaks, relative to the base line, which are attributable to the various proton species present and the area of which is in each instance proportional to the number of protons causing the absorption. Olefinic protons, that is, protons attached to carbon atoms connected by an olefinic double bond, provide a particular absorption peak, which is located by reference to the spectrum of a material which is structurally equivalent to the unsaturated unit in the interpolymer. The position of the various absorptions is taken relative to a reference material included with the sample, usually tetramethylsilane. When the level of saturation is low, it is desirable to employ a time-averaging computer (e.g., an Enhancetron) in conjunction with the NMR spectrometer, greater accuracy at low absorption levels being thus obtained.

By utilizing a known amount of the interpolymer and including therewith a known amount of another material which serves as an internal standard and which has a known weight of protons which give absorption in a region other than the interpolymer, the weight percent of olefinic protons in the interpolymer can be determined.

The measurement of the area of each absorption peak is conventionally performed automatically by the NMR spectrometer, and is expressed as an "integral height." The integral height is proportional to the area of the absorption peak and is measured in arbitrary units from the base line to the point at which no further signal is recorded, as indicated by a plateau recorded by the spectrometer.

As an example of the manner in which NMR determinations, as discussed herein, are obtained, the weight percent unsaturation in an interpolymer of ethylene, propylene and dicyclopentadiene is determined as follows:

A known amount of interpolymer is dissolved in carbon tetrachloride or other solvent in a concentration ranging from about 2 to about 5 weight percent solids. It is desirable to obtain a solution with the lowest possible viscosity while still maintaining sufficient concentration for the sample to be observed by the NMR techniques. There is added to the sample a quantitative amount of an internal standard; in this case, diphenyl ether is generally employed, since the absorption of the aromatic protons therein is in a different region than the absorption of the interpolymer. There is also added about 1 percent tetramethylsilane, which is used to obtain a reference point on the NMR spectrum. The sample is placed in a glass sample tube (5 mm. O.D., 0.5 mm. wall), and the NMR spectrum is obtained on a Varian Model A-60 spectrometer operating at 60 megacycles. The spectrum is recorded over a 500 cycles per second sweep width, downfield from the tetramethylsilane reference. The radio frequency level of the spectrometer is kept below the point of saturation. Additional spectral parameters vary from sample to sample, depending upon concentration and quality of the spectrum.

The spectrum shows NMR absorptions in the regions $\tau=4.4$ to $\tau=4.5$ and $\tau=6.7$ to $\tau=9.5$. (The position of these absorptions is taken relative to the tetramethylsilane reference which occurs at $\tau=10$.) The position of the peaks is solvent dependent, and would usually be altered if the sample were dissolved in some solvent other than carbon tetrachloride. The series of absorptions in the region of $\tau=6.7$ to 9.5 is attributed to the aliphatic protons, including all methyls, methylenes, and methine species. The absorption in the region $\tau=4.4$ to 4.5 is specifically attributed to olefinic protons of the cyclopentene portion of the polymer. More specifically, the intense singlet in the region $\tau=8.7$ to $\tau=8.8$ is assigned to the methylene protons in the polymer unit, and the absorptions to higher field in the region of $\tau=9.1$ to 9.2 is identified as methyl protons. The various smaller absorptions between $\tau=7.0$ and $\tau=8.3$ are attributed to the methine protons of the polymer unit as well as those protons resulting from the aliphatic portion of the cyclopentene. The absorptions due to the protons from the diphenyl ether are found at about $\tau=2.5$ to $\tau=3.3$.

The integral height of the absorption peaks of the olefinic protons and that of the diphenyl ether are obtained by the (automatic) measurement of the areas by the spectrometer, and the extent of unsaturation is then calculated by the following equation:

Weight percent olefinic protons $$= \frac{(0.588)(W_r)(I_x) \times 100}{(I_r)(W_x)}$$

where .0588 is the weight fraction of protons per mole of diphenyl ether (10 protons per 170 grams); $W_r$ and $W_x$ are the weights in grams of diphenyl ether and interpolymer respectively. Since there are present two olefinic protons per

group, the weight percent of unsaturation is obtained by multiplying the figure obtained from the above calculation by 24/2 or 12.

It should be noted that the reactivity of the interpolymers herein is such that small but significant amounts of unsaturation may be lost by oxidation or other reaction during handling. This is especially true of small samples used for analysis. Therefore, it is desirable to protect the samples as much as possible, using for example, an inert gas blanket, and to minimize handling and exposure. Otherwise, low values may be obtained on analysis. For this reason, it is usually better to rely on the curing characteristics as indicative of the necessary extent of unsaturation, with numerical values being used chiefly for comparison of samples handled similarly.

The proportions of the components of the interpolymer can be varied widely, it being necessary only to provide sufficient unsaturation in the polymer to permit oxidative curing. The amount varies with the particular polyunsaturated compound. For instance, there should be interpolymerized along with the monoolefin or monoolefins at least about 11 percent of dicyclopentadiene or similar diene.

Among the polyunsaturated compounds that can be employed in producing the interpolymers herein are the various dienes and other polyenes. It is preferred that the polyunsaturated hydrocarbon contain nonconjugated ethylenic groups, and it is preferred that it be alicyclic, this being particularly the case when the polyunsaturated compound contains conjugated unsaturation. Thus, nonconjugated polyenes and conjugated alicyclic polyenes are preferred to conjugated aliphatic polyenes.

Included among the polyunsaturated compounds that can be employed are cyclic polyenes such as cycloalkadienes; substituted norbornenes, e.g., 5-alkenyl-2-norbornenes; substituted norbornadienes, e.g., 2-alkyl norbornadienes; unsaturated terpenes, such as limonenes; and similar compounds. The polyene may contain substituents such as halogen or oxygen-containing radicals but, in general, it is preferred to employ unsubstituted hydrocarbons containing only carbon and hydrogen.

While dicyclopentadiene is the presently preferred monomer, some representative examples of specific polyunsaturated compounds that can be utilized are:

1,4-pentadiene
1,9-decadiene
3,3-dimethyl-1,5-hexadiene
1,4-hexadiene
1,9-octadecadiene
6-methyl-1,5-heptadiene
7-methyl-1,6-octadiene
11-ethyl-1,11-tridecadiene
1,3-cyclopentadiene
1,3-cyclooctadiene
5-methyl-1,3-cyclopentadiene
1-methyl-3-isopropyl-1,3-cyclopentadiene
Dicyclopentadiene
Tricyclopentadiene
5-methyl-1,3-cyclopentadiene dimer
2-methyl-4-ethyl-1,3-cyclopentadiene dimer
1,4-cyclohexadiene
1,5-cyclooctadiene
1,5-cyclododecadiene
1,5,9-cyclododecatriene
1,4,6-cyclooctatriene
5-(2'-butenyl)-2-norbornene
5-(2'-ethyl-2'-butenyl)-2-norbornene
5-(1,5-propenyl)-2-norbornene
5-(2'-heptyl-1'-undecenyl)-2-norbornene
5-(2'-propyl-2'-pentenyl)-2-norbornene
5-methylene-2-norbornene
2-methyl norbornadiene
2-ethyl norbornadiene
2-isopropyl norbornadiene
2-heptyl norbornadiene
1,8(9)-p-menthadiene
Divinylbenzene
5-vinylbicyclo[2.2.1]hept-2-ene
Bicyclo[4.3.0]nona-3,7-diene
4-vinyl cyclohexene-1

Any monoolefin having a single copolymerizable ethylenic group can be interpolymerized with the polyene. Although interpolymers satisfactory for some purposes can be made by interpolymerizing the polyunsaturated compound with a single monoolefin, e.g., copolymers of ethylene and dicyclopentadiene, or propylene and dicyclopentadiene, it is preferred to employ at least two comonomers with the polyunsaturated compound, one of these being ethylene. It is further preferred that ethylene comprise a substantial proportion of the interpolymer, i.e., at least about 30 percent by weight. It is desirable that the interpolymer be amorphous rather than substantially crystalline, and the tendency of ethylene to form crystalline polymers is reduced by the inclusion of a second comonomer.

Thus, a class of preferred interpolymers comprises a nonconjugated diene, ethylene, and at least one other monoolefin having a single terminal ethylenic group.

Of the large number of usable monoolefins, the preferred comonomers include those having the formula

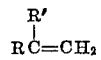

where R is alkyl having, for example, up to about 20 carbon atoms, or aryl, and R' is hydrogen or alkyl of up to about 20 carbon atoms. Compounds of this class include propylene, 2-methylpropene, 2-propylhexene-1, 1-butene, 4-methyl-1-pentene, 1-pentene, 1-hexene, 1-octene, 5 - methyl - 1 - nonene, 5,6,6-trimethyl-1-decene, 1-dodecene, 1-tetradecene, 1-octadecene, styrene and vinyl toluene.

The proportion of the second comonomer is not critical since, as mentioned, copolymers of a single monoolefin of the class described with the polyunsaturated compound can be employed. The preferred proportions vary depending on the identity of the particular monomers. For example, interpolymers of ethylene, propylene, and a nonjugated diene, usually dicyclopentadiene, are among the most desirable interpolymers herein. Such interpolymers generally contain from about 10 percent to about 70 percent ethylene, from about 10 percent to about 40 percent of propylene, and from about 5 percent to about 50 percent of the diene. It will be understood that the minimum amount of diene that can be employed depends to some extent upon its molecular weight. (The above perentages are by weight; the same is true of all parts and percentages throughout this specification unless otherwise specified.)

The amount of active vanadium compound catalyst present is important in obtaining interpolymers of the desired properties and the desired catalyst efficiency range. The concentration of catalyst employed is defined in terms of the concentration of polymerization active vanadium compound in the monomer-saturated reaction mixture, polymerization activity being evidenced by significant monomer consumption. It is found that this concentration must be maintained no higher than about 0.5 and preferably 0.002 moles or less per liter in order to produce the desired products in efficient amounts. The minimum concentration is not critical since any amount produces some product. It is generally preferred to have present at least about 0.001 millimole of vanadium compound per liter of reaction mixture.

The alkyl aluminum halide co-catalyst utilized along with the vanadium compound is typically ethyl aluminum dichloride, ethyl aluminum sesquchloride, diethyl aluminum chloride, butyl aluminum sesquichloride, ethyl aluminum sesquiiodide, or other alkyl aluminum halide. Other aluminum compounds include diisobutyl aluminum chloride, diethyl aluminum iodide, diethyl aluminum bromide, diethyl aluminum fluoride, ethyl isobutyl aluminum chloride. The above listing is not exhaustive, but typical of available alkyl aluminum halides. Any aluminum compound of the formula:

$$R_nAlX_{3-n}$$

where R is phenyl or lower alkyl and X is chlorine, bromine, iodine or fluorine and where $n$ is 1, 2 or 3, preferably 1 or 2.

As can be seen from the formula, it is possible to employ $R_3Al$ or $R_2AlH$ compounds with the vanadium compounds, provided halogen is introduced from the vanadium compound or a compound such as an aluminum halide, for example $R_3Al+AlX_3$ in situ forms an active catalyst which may be $R_3Al_2X_3$.

The catalyst mixture resulting from the interaction of the catalyst and co-catalyst are of the type known as Ziegler or Ziegler-Natta catalysts and are soluble in the reaction media.

The concentration of the co-catalyst is not ordinarily critical, provided it is employed in at least equimolar amounts; however, it is usually employed in an amount between about 3 to 30 moles per mole of vanadium compound.

In carrying out the process, there is employed a liquid reaction medium, which is suitably an inert organic solvent or one of the reactants in liquid form. Generally preferred is suitably purified benzene, chlorobenzene, or similar aromatic solvents in that the most homogeneous products result with such solvents. For efficient operation, care should be taken to exclude oxygen and moisture. When chelated vanadium compounds of vanadium alcoholates are employed, the temperature is maintained at room temperature or, more preferably, below, e.g., 15° C. or lower, with temperatures as low as $-80°$ C., or lower, being advantageously utilized, as the activity of such catalysts is prolonged at lower temperatures. When vanadium halides or oxyhalides such as $VCl_4$ and $VOCl_3$ are employed as catalysts, higher polymerization temperatures can be utilized. For example, temperatures from 20° C. to as high as 170° C. can be advantageously utilized. One or more reactant is usually a gas, and they are generally fed to the reaction vessel as the polymerization progresses. Atmospheric pressure can be utilized in carrying out the interpolymerization reaction, but it is usually more efficient to employ moderately elevated pressures up to 50 atmospheres; however up to 1000 atmospheres or more may be employed.

The interpolymers and the properties set forth above are produced from the foregoing monomers by carrying out the interpolymerization by incremental addition of a catalyst composed of an organic vanadium compound and an alkyl aluminum halide co-catalyst.

The most preferred organic vanadium compounds have been found to be the vanadium tris(acetylacetonate) and vanadium oxybis(acetylacetonate). Others include vanadium salicylate, vanadium 8-hydroxy quinoline, vanadium tris(hexafluoroacetylacetonate), vanadium tris(trifluoroacetylacetonate), vanadium tris(benzolacetonate), vanadium chlorobis(acetylacetonate), isopropyl vanadate, 2-ethylhexylvanadate, ethyl dichlorovanadate, diethyl chlorovanadate, di-n-propylchlorovanadate and n-propyl-dichlorovanadate. Vanadium tetrachloride and vanadium oxytrichloride can also be used provided they are utilized in such a manner as to give soluble catalysts.

Although not necessary for the practice of the invention, certain catalyst modifiers such as Lewis bases may be employed in catalytic amounts with the above catalysts. These include such chemical compounds as ethyl or isopropyl ether, tetrahydrofuran, anisole, pyrridine and trimethyl amine. These may be complexed with one or both of the catalyst components prior to addition to the reactor or prior to adding one or both of the catalyst components.

In a typical procedure for the production of the interpolymers, the solvent is saturated with ethylene or propylene or other gaseous monomer and the polyunsaturated compound and other non-gaseous monomer added, followed by the alkyl aluminum halide. If desired, all the alkyl aluminum halide necessary for the entire batch run may be added at this point. The polymerization is commenced by addition of the vanadium compound. The gaseous monomers are added continuously, using an excess in order to maintain saturation of the mixture. In the embodiment of the process which comprises this invention, increments of the vanadium compound or vanadium compound and alkyl aluminum halide are added during the polymerization. In the most preferred embodiment, in order to maintain relative homogeneity of the polymer produced, additional portions of polyunsaturated compound and any other non-gaseous monomer that is present in the original reaction mixture is added along with the increments of catalysts. Alternatively one or both of the catalysts and the polyunsaturated compound and, if desired, any non-gaseous monomer can be added continuously to maintain the desired concentration, so long as the concentration of active catalyst does not exceed that set forth above.

In the preferred embodiment, a molecular weight regulator is present in the reaction mixture. These molecular weight regulators take many forms and include gases such as hydrogen, as well as other inert gas diluents of monomer streams such as nitrogen and the like, as well as chemical compounds such as norbornadiene, 4-vinylhexene-1, diisobutyl aluminum hydride, alkyl halides, organic acids and dialkyl zinc compounds.

A preferred method of controlling molecular weight employs hydrogen in an amount comprising from 5 to 99 percent by volume of the total gaseous monomer feed. A more preferred embodiment utilizes from 25 to 90 percent by volume of hydrogen.

In yet another embodiment, from 1 to 99 percent of the hydrogen may be replaced with an inert gas such as argon, nitrogen or propane such that a gaseous feed comprising monomers (ethylene, propylene, butene, etc.), hydrogen and said inert gas is added to the polymerization mix. In this embodiment, the inert gas functions as a diluent for the reactive monomers and hydrogen and, as such, can affect molecular weight.

In yet another embodiment, hydrogen or hydrogen-inert gas mixtures may be advantageously employed in combination with other chemical compounds for the purpose of regulating molecular weight. Such chemical compounds include norbornadiene and diethyl zinc mentioned above or others which can effect molecular weight such as alkyl halides, carboxylic acids, alkyl metal hydrides, etc.

To illustrate the invention, there are given below several examples of the method and practice of the invention, both in producing the aforesaid interpolymers and their utilization in coating compositions. All parts and percentages are by weight unless otherwise specified.

EXAMPLE I

The reactor employed in the following example was a modified Sutherland reactor. The reactor head was equipped with a gas inlet, with dip tube; a gas outlet with pressure gauge, needle valve, and pressure relief valve in line; a valved liquid dropout tube with dip tube to the bottom of the reactor; coolant inlet and coolant outlet connected to internal cooling coils, and to external refrigeration system employing methanol coolant; an injection port with a rubber septum and a stirrer. Solvent may be charged from a reservoir through the inlet to the reactor. The reactants employed were of the purity normally employed in Ziegler polymerizations. Care was taken to remove and exclude moisture and oxygen.

Into the thoroughly dried reactor was charged one liter of benzene, which was sparged with nitrogen at 20° C. to insure the absence of oxygen. There was then added 0.15 mole of dicyclopentadiene and the reaction mixture was saturated with a 75:25 volume ratio mixture of hydrogen and ethylene. 0.001 mole of ethyl aluminum sesquichloride, as a 25 percent solution in toluene, was then added. The reactor was then sealed, that is, all outlets were closed and the reactor pressurized with hydrogen to 35 p.s.i.g. The hydrogen was shut off and the reactor pressurized to 50 p.s.i.g. with ethylene. The ethylene feed was left open at 50 p.s.i.g. There was then added .0001 mole of vanadium tris(acetylacetonate), as a .05 molar solution in benzene. An uptake of ethylene was noted and an exotherm occurred, the temperature of the reaction mixture ranging from 20° C. to 25° C. Cooling was commenced to return the temperature of the reaction mixture to 20° C. The reaction mixture was allowed to continue to stir for 10 minutes and then the reactor was vented to atmospheric pressure and a sample removed from the reactor. There was then added 0.15 moles dicyclopentadiene and 0.001 mole of ethyl aluminum sesquichloride. The reactor was then repressurized to 36 p.s.i.g. with hydrogen and further pressurized to 50 p.s.i.g. with ethylene, the ethylene feed remaining open at 50 p.s.i.g. There was then injected 0.0001 mole of vanadium tris(acetylacetonate). An exotherm was again noted and the reaction was cooled in the manner described above and after 10 minutes the reactor was vented to 0 p.s.i.g. and a sample withdrawn.

A third, fourth, and fifth incremental addition and reaction were conducted in the manner described above with the exception that 0.10 mole of dicyclopentadiene was added in each of the third, fourth and fifth increments. Again, a sixth, seventh, eighth, ninth and tenth increment was made and the reaction run in the manner conducted above, with the exception that the reactor was first pressurized to 38 p.s.i.g. with hydrogen rather than 36 p.s.i.g. as in Increments 3 through 5. The percent solids was measured on the samples drawn at the end of the incremental reactions and were as follows:

|  | Percent |
|---|---|
| First increment, or initial charge | 1.7 |
| Second increment | 2.8 |
| Fourth increment | 5.6 |
| Sixth increment | 8.5 |
| Eight increment | 11.2 |
| Tenth, or last, increment | 13.7 |

The polymerization was terminated by the addition of 10 milliliters of methanol. The reaction mixture was then washed with 30 milliliters of concentrated HCl and then washed acid free with 15 one-liter portions of distilled water. The benzene was stripped at reduced pressure and replaced with about 15 liters of mineral spirits, which was stripped to 49 percent solids. NMR analysis shows 43.4 percent DCPD.

EXAMPLE II

In the reactor described in Example I there was charged one liter of benzene, which was sparged at 20° C. with nitrogen. There was then fed through the reaction mixture a 2:1 volume mixture of propylene and ethylene containing 40 volume percent of hydrogen, that is, 8 liters per minute propylene, 4 liters per minute of ethylene and 8 liters per minute of hydrogen. When the reaction mixture was saturated, there was added 0.001 mole ethyl aluminum sesquichloride, as a 25 percent solution in toluene, and 0.15 mole dicyclopentadiene. The ethylene valve was then closed and the pressure release valve set at 50 p.s.i.g. The same ratio of gases as was continually passed through the reactor, the excess gas being vented off through the pressure release valve. There was then added 0.0001 mole of vanadium tris(acetylacetonate), as a 0.05 molar solution in benzene. A temperature rise was noted, the temperature rising from 20° C. to approximately 25° C. There was a drop in the rate of ethylene effluent. Cooling was commenced and the temperature of the reaction mixture returned to 20° C. The stirring of the reaction mixture was continued for 10 minutes and the reactor then vented to atmospheric pressure and a sample withdrawn.

In the second through sixth increments, the reaction was conducted in the manner of the initial charge, with the exception that 0.10 mole of dicyclopentadiene was added to the reaction mixture. The ethyl aluminum sesquichloride was then added and the reactor pressurized at 50 p.s.i.g. The vanadium tris(acetylacetonate) was then added. The exotherm was noted and cooling commenced. After 10 minutes, the pressure was dropped and a sample withdrawn. Increments 7 and 8 were conducted in the manner of Increments 2 through 6 with the exception that the ratio of the gas feed was changed to the following: 8 liters per minute propylene, 4 liters per minute of ethylene and 5 liters per minute of hydrogen. The difference in percent solids at the end of each incremental reaction was as follows:

|  | Percent |
|---|---|
| First increment, or initial charge | 1.7 |
| Second increment | 1.1 |
| Third increment | 1.2 |
| Fourth increment | 1.0 |
| Fifth increment | 1.0 |
| Sixth increment | 0.8 |
| Seventh increment | 1.0 |
| Eight increment | 0.9 |

The total percent solids were 8.6 percent. By NMR analysis, the resins contain 31.4 percent dicyclopentadiene, 32.7 percent of propylene and 35.9 percent ethylene by percent difference.

EXAMPLE III

A thoroughly clean and dry reaction vessel was flushed with nitrogen gas, charged with 2.5 liters of benzene, and sparged with nitrogen for 15 minutes. Ethylene and propylene were passed into the solvent at a rate of 2.0 liters and 4.0 liters per minute, respectively, and this was maintained throughout the polymerization. There were then added 25 milliliters of dicyclopentadiene and, after cooling to 7° C., 7.5 milliliters of 1.0 molar solution of ethyl aluminum sesquichloride in benzene were added. While maintaining the temperature at between 7° C. and 11° C., 25 milliliters of a 0.01 molar solution of vanadium oxybis(acetylacetonate) in benzene were introduced, whereupon off-gas rate dropped to zero, then rose in two minutes to 360 liters per hour, indicating that absorption had ceased. Another 26 milliliter portion of the vanadium oxybis(acetylacetonate) solution was added, whereupon again all the gas added was absorbed for a short time and then absorption ceased. The catalyst addition was again repeated, and after absorption ceased once more, 25 milliliters of dicyclopentadiene were added, along with another catalyst portion as above. Three more additions of the vanadium catalyst were made, in each case after absorption had ceased.

The polymerization was carried out for a total of 40 minutes from the time of the first vanadium catalyst addition, and was terminated by the addition of 10 milliliters of methanol. The reaction mixture was then washed with 30 milliliters of concentrated HCl, and then washed acid-free with 15 one-liter portions of distilled water. The benzene was stripped at reduced pressure, and replaced with about 1.5 liters of mineral spirits, and stripping continued until most of the mineral spirits had been removed. There was obtained 247 grams of solution containing 78.8 grams of interpolymer (solids content of 31.0 percent). Infrared analysis of the product showed the absence of free dicyclopentadiene and indicated that the approximate polymer composition was 40 percent ethylene, 24 percent propylene and 36 percent dicyclopentadiene, all in polymerized form.

EXAMPLE IV

A clean, dried reaction vessel was flushed with nitrogen, charged with 3.0 liters of aromatic naphtha (Solvesso 100) and sparged with nitrogen for 15 minutes. Ethylene and propylene were then passed into the solvent at a rate of 2.0 liters per minute each. There were added 8.4 milliliters of a one molar solution of ethyl aluminum sesquichloride in benzene, and the mixture was cooled to 7° C. The rate of ethylene and propylene was decreased to 1.0 liters per minute each and 20 milliliters of dicyclopentadiene were added. There were then added 20 milliliters of a 0.01 molar solution of vanadium tris (acetylacetonate) in benzene. After 2 minutes the rate of ethylene and propylene addition was again increased to 2.0 liters per minute each and continuous addition of 2.0 milliliters per minute of the vanadium compound solution and 1.0 milliliters per minute of dicyclopentadiene was begun.

The temperature rose to 12° C. and then slowly fell to 7° C. to 9° C. during the remainder of the polymerization. After 9 minutes from the initial vanadium catalyst addition, the rate of addition of the vanadium catalyst solution was increased to 4.0 milliliters per minute and the addition of dicyclopentadiene was increased to 2.0 milliliters per minute. After six more minutes, the rate of ethylene and propylene addition was decreased to 1.0 liters per minute each. After 32 more minutes, the addition of dicyclopentadiene was ended, and after another 11 minutes the addition of the vanadium compound was complete. Ethylene and propylene were passed into the mixture for another 20 minutes, and then 10 milliliters of methanol were added. A total of 210 milliliters of the vanadium compound solution and 90 milliliters of dicyclopentadiene had been added.

The clear product solution was washed 3 times with 5 percent aqueous HCl, then washed with distilled water until acid-free. The solution was then concentrated at 12 to 20 millimeters of mercury pressure and 35° C. to 45° C. There was obtained a solution having a solids content of 9.4 percent and containing a total of 66.9 grams of interpolymer.

EXAMPLE V

Into a reactor as described in Example I was charged 1.5 liters of benzene under nitrogen. There was then added 3.6 millimoles (1.16 molar solution in toluene) of ethyl aluminum sesquichloride and 20.4 cubic centimeters of dicyclopentadiene. The reactor was sealed, that is, all outlets were closed and the reactor pressurized with hydrogen to 28 p.s.i.g. The hydrogen was shut off and the reactor pressurized to 42 p.s.i.g. with propylene. The propylene feed was shut off and the reactor pressurized to 50 p.s.i.g. with ethylene at which time a gas feed line into the reactor was maintained at 50 p.s.i.g. with a 1:1 molar ratio of ethylene and propylene. There was then added 0.15 millimole of vanadium tris(acetylacetonate) as a .05 molar solution in benzene. An uptake of gaseous monomer was noted and an exotherm occurred (18–24° C.). Cooling was commenced to return the temperature to 20° C. The reaction mixture was allowed to stir for 10 minutes and then the reactor was vented to atmospheric pressure and a sample removed. There was then added 4.1 cc. of dicyclopentadiene and 3.6 millimoles of ethyl aluminum sesquihalide. The reactor was then repressurized to 42 p.s.i.g. with hydrogen and further pressurized to 46 p.s.i.g. with propylene and then to 50 p.s.i.g. with ethylene. Again, the gaseous monomer feed was adjusted to a 1:1 molar ethylene/propylene mixture at 50 p.s.i.g. There was then injected .15 millimole of vanadium tris-(acetylacetonate). An exotherm was again noted and the reaction cooled in the manner described above and after 10 minutes the reactor was vented to 0 p.s.i.g. and a sample withdrawn.

A third incremental addition was conducted as the second with the exception that the hydrogen was changed to 46 p.s.i.g., no propylene was charged and ethylene was charged to 50 p.s.i.g.

A fourth, fifth, sixth, seventh, eighth, ninth and tenth incremental addition was conducted as the second except that the reactor was charged to 48 p.s.i.g. with hydrogen and to 50 p.s.i.g. with ethylene. The percent solids was measured on the samples drawn at the end of each increment and were as follows:

| | Percent |
|---|---|
| First increment, or initial charge | 1.1 |
| Second increment | 2.2 |
| Third increment | 3.1 |
| Fourth increment | 4.4 |
| Fifth increment | 5.3 |
| Sixth increment | 5.0 |
| Seventh increment | 6.8 |
| Eighth increment | 7.8 |
| Ninth increment | 8.7 |
| Tenth increment | 9.7 |

Catalyst efficiency is equal to 250 grams of polymer per gram of vanadium compound.

In a single increment run in comparison to the above, into a reactor was charged under nitrogen one liter of benzene. There was added 38.2 cc. of dicyclopentadiene and 8.6 cc. of ethyl aluminum sesquichloride as a 1.16 molar ratio in toluene (10.0 millimoles). The temperature was adjusted to 18–20° C. and hydrogen charged to 28 p.s.i.g., then propylene to 42 p.s.i.g. and ethylene to 50 p.s.i.g. The gaseous monomer feed was adjusted to a 1:1 molar ratio of ethylene and propylene at 50 p.s.i.g. There was then added 10 cc. of 0.1 molar vanadium tris(acetylacetonate). There was an immediate exotherm and takeup of monomer. The temperature rose to 28° C. and was cooled back to 20° C. After 10 minutes no monomer takeup was evident and the reaction was terminated. Catalyst efficiency was 85.3 grams of polymer per gram of vanadium compound.

Tests have shown that interpolymers which cure through an oxidative mechanism, as discussed above, are produced from various other polyunsaturated hydrocarbons; these include 1,3-cyclopentadiene and methylcyclopentadiene dimer.

The foregoing illustrate the invention in its preferred embodiments, but it is, of course, understood that numerous variations and modifications can be made within the scope of the invention as described. For example, other polyunsaturated hydrocarbons and monoolefins can be substituted for those employed in the examples.

According to the provisions of the patent statutes, there are described above the invention and what are now considered to be its best embodiments. However, within the scope of the appended claims, it is to be understood that the invention can be practiced otherwise than as specifically described.

We claim:

1. In a method of producing a non-rubbery interpolymer having sufficient ethylenically unsaturated groups in the polymer molecule to permit substantial curing of films thereof by oxidative mechanism, said interpolymer having an intrinsic viscosity no higher than about 0.6, which comprises batch interpolymerization of a cyclic polyene monomer selected from the group consisting of 1,3-cyclopentadiene, 5-methyl-1,3-cyclopentadiene dicyclopentadiene, tricyclopentadiene, and 5-methyl-1,3-cyclopentadiene dimer with at least one monoolefin monomer having a single terminal ethylenic group in a liquid reaction media in the presence of an alkyl aluminum halide, at least one vanadium compound, and a molecular weight regulator, the improvement comprising adding the catalyst comprising a vanadium compound in incremental portions, the concentration of polymerization-active vanadium compound in the reaction mixture being maintained below about 0.05 moles per liter throughout the polymerization.

2. The method of claim 1 wherein the concentration of the polymerization active vanadium compound is .002 moles per liter or less.

3. The method of claim 1 wherein the molecular weight regulator is hydrogen.

4. The method of claim 3 wherein the cyclic polyene is dicyclopentadiene.

5. The method of claim 1 wherein the monoolefin comprises ethylene.

6. The method of claim 5 wherein the monoolefin comprises a mixture of ethylene and at least one other monoolefin containing a terminal ethylenic group.

7. The method of claim 6 wherein the other monoolefin comprises propylene.

8. The method of claim 1 wherein the catalyst system is soluble in the reaction media.

9. The method of claim 8 wherein the interpolymer contains from about 10 percent to about 70 percent ethylene and the cyclic polyene comprises dicyclopentadiene or cyclopentadiene or oligomers thereof.

10. The method of claim 9 wherein the interpolymer is comprised of about 15 percent to about 50 percent by weight of dicyclopentadiene, from about 10 percent to about 40 percent by weight of propylene and from about 10 percent to about 70 percent by weight of ethylene.

References Cited

UNITED STATES PATENTS

| | | | |
|---|---|---|---|
| 3,441,546 | 4/1969 | Garner | 260—80.7 |
| 3,444,149 | 5/1969 | Kelly | 260—80.78 |
| 3,291,780 | 12/1966 | Gladding | 260—80.5 |
| 3,260,708 | 7/1966 | Natta | 260—795 |

FOREIGN PATENTS

| | | |
|---|---|---|
| 1,492,025 | 7/1967 | France. |

JOSEPH L. SCHOFER, Primary Examiner

R. S. BENJAMIN, Assistant Examiner

U.S. Cl. X.R.

260—80.78, 88.2 D, 85.3 R